Dec. 27, 1949    J. A. LA RIVIERÈ    2,492,157
WHEELBARROW WITH STEERING DEVICE
Filed May 18, 1948

INVENTOR.
Joseph A. La Rivierè
BY *Victor J. Evans & Co.*
ATTORNEYS

Patented Dec. 27, 1949

2,492,157

UNITED STATES PATENT OFFICE 2,492,157

WHEELBARROW WITH STEERING DEVICE

Joseph A. La Rivière, Vancouver, British Columbia, Canada

Application May 18, 1948, Serial No. 27,631

4 Claims. (Cl. 280—52)

This invention relates to a wheel barrow and more particularly to a wheel barrow provided with a steering mechanism.

The object of the invention is to provide steering means for a transport vehicle such as a wheel barrow whereby the vehicle may be steered in order to make turns without requiring lateral swinging movement of the vehicle.

Another object of the invention is to provide steering means for hand operated vehicles in which the steering operation may be carried out without requiring that the operator shift his hands from their normal positions on the handle.

A further object of the invention is to provide a steering means for a transport vehicle such as a wheel barrow which is extremely simple and inexpensive to manufacture.

Other objects and advantages will be apparent during the course of the following description.

In the accompanying drawings forming a part of this application, and in which like numerals are employed to designate like parts throughout the same:

Figure 3 is a view taken on the line 3—3 of Figure 2;

Figure 4 is a sectional view taken on the line 4—4 of Figure 1;

Figure 5 is a sectional view showing a modified type of slide;

Figure 6 is a perspective view of the slide.

Figure 1:
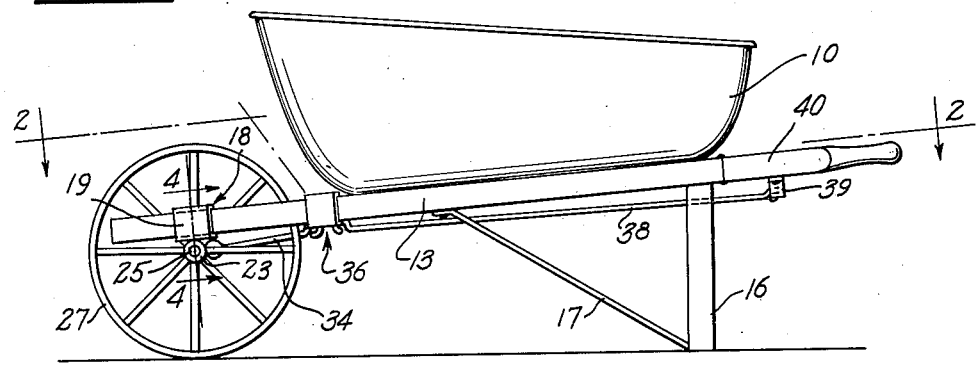
Figure 1 is a side elevational view of the wheel barrow provided with the steering means, according to the present invention.
Figure 2:
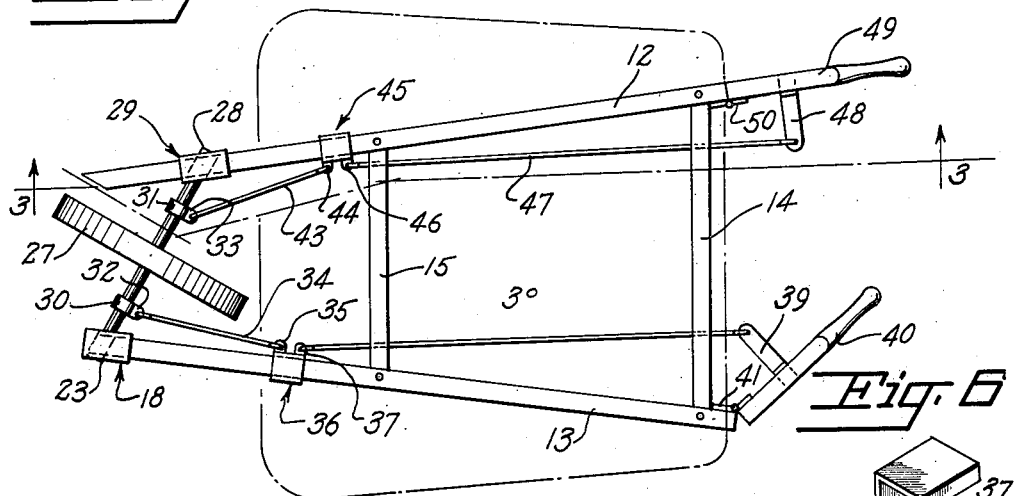
Figure 2 is a view taken on the line 2—2 of Figure 1.

Referring to Figures 1 and 2 of the drawings, the numeral 10 designates the barrow body or receptacle, and secured to the barrow body or receptacle 10 by rivets 11 are the side bars 12 and 13, Figure 2. Extending between the side bars 12 and 13 and secured thereto are the spaced, parallel braces 14 and 15 for bracing the bars 12 and 13 and supporting the receptacle 10. Arranged at the rear end of said receptacle and dependingly carried by each of the side bars 12 and 13 are the legs 16, the legs 16 being braced by means of the posts 17 extending between the side bars and the legs and secured thereto.

Slidably mounted on the front end of the bar 13 is the slide 18 which is provided with a web 19, Figure 4, an L-shaped upper leg 20 and the lower apertured leg 21 secured to the web 19. Extending through the apertured leg 21 is the headed pin 22 having its lower end secured to the swivel bearing 23 so that a pivotal connection is provided between the bearing 23 and the slide 18, Figures 2 and 4. The swivel bearing has a cylindrical opening 24 extending longitudinally therethrough for rotatably receiving the reduced end 25 of the axle 26 therein. Fixedly mounted on the axle 26 intermediate its ends is the supporting wheel 27, the other end of the axle 26 is rotatably carried by a swivel bearing 28, Figure 2, the swivel bearing 28 being pivotally connected to the slide 29 in a manner exactly like the pivotal connection between the slide 18 and the swivel bearing 23, as previously described. The slide 29 is likewise mounted for sliding movement along the side bar 12.

Arranged in spaced relation on each side of the supporting wheel 27 and rotatably mounted on the axle 26 are the clamps 30 and 31 having eyes 32 and 33, respectively, Figure 2. Engaging the eye 32 of the clamp 30 is the hooked end of the rod 34, the other end of the rod 34 engaging an eye 35 of the bracket 36 which is slidably mounted on side bar 13. The sliding bracket 36 is further provided with a second eye 37 which is engaged by a hooked end of a link 38. The other hooked end of the link 38 is pivoted to an apertured bracket 39 which is dependingly carried by a handle 40. The handle 40 is hingedly connected to the rear end of the side bar 13 by means of hinge 41 secured to the handle 40 and side bar 13 by the plurality of screws 42.

Engaging the eye 33 of the clamp 31 is the hooked end of the rod 43, the other end of the rod 43 engaging an eye 44 of the bracket 45 which is slidably mounted on the side bar 12. The sliding bracket 45 is further provided with a second eye 46 which is engaged by a hooked end of a link 47. The other hooked end of the link 47 is pivoted to an apertured bracket 48 which is dependingly carried by the handle 49, said handle being hingedly connected to the side bar 12 by means of the hinge 50.

In Figure 5, a modified slide 51 is shown for use when cylindrical side bars 52 are used in place of the rectangular side bars 12 and 13. In this modified arrangement, the side bar is provided with a longitudinal slot 53 and extending through the slot 53 is the headed bolt 54 which is spaced from the bar 52 made rotatable by the washers 55 and 56, the lower end of the headed bolt 54 being secured to the swivel bearing 23.

The operation of the device is as follows: When it is desired to turn the wheel barrow, either the handle 49 or the handle 40 is pivoted. Thus, when the handle 40 is pivoted inwardly as shown in Figure 2, the link 38 connected thereto causes the clamp 36 to slide forward on the side bar 13 to thereby move the rod 34 forwardly, said movement causing a forward movement of the end 25 of the axle 26 to thereby effect a turning of the supporting wheel 27. When it is desired to go in a forward direction, the handle 40 is pivoted back to its end to end position with respect to the side bar 13, thereby causing the link 38, rod 34, and the end 25 of the axle to resume their original position. In a similar manner, the handle 49 can be used to effect a turning movement of the wheel barrow, if desired.

In view of the foregoing description taken in conjunction with the accompanying drawings it is belived that a clear understanding of the construction, operation and advantages of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claims.

Having described the invention, what is claimed as new is:

1. In a wheel barrow including a receptacle and a pair of side bars spaced below said receptacle and secured thereto, the improvement consisting of providing steering means for said wheel barrow, said steering means comprising a slide arranged adjacent the front end of each of said side bars and mounted for sliding movement therealong, a bearing pivotally connected to each of said slides, an axle rotatably mounted in said bearings, a wheel on said axle for suporting said receptacle, and means for moving said slides along said side bars.

2. In a wheel barrow including a receptacle and a pair of said side bars spaced below said receptacle and secured thereto, the improvement consisting of providing steering means for said wheel barrow, said steering means comprising a slide arranged adjacent the front end of each of said side bars and mounted for sliding movement therealong, a bearing pivotally connected to each of said slides, an axle rotatably mounted in said bearings, a wheel on said axle for supporting said receptacle, and means for moving said slides along said side bars, said last-named means embodying a clamp slidably mounted on each of said side bars and operatively connected to the complemental slide, and means on the rear end of each of said side bars operatively connected to the respective clamps for sliding the latter along said side bars.

3. In a wheel barrow including a receptacle and a pair of side bars spaced below said receptacle and secured thereto, the improvement consisting of providing steering means for said wheel barrow, said steering means comprising a slide arranged adjacent the front end of each of said side bars and mounted for sliding movement therealong, a bearing pivotally connected to each of said slides, an axle rotatably mounted in said bearings, a wheel on said axle for supporting said receptacle, and means for moving said slides along said side bars, said last-named means embodying a clamp slidably mounted on each of said side bars and operatively connected to the complemental slide, and means embodying a handle pivoted on the rear end of each of said side bars operatively connected to the respective clamps for sliding the latter along said side bars.

4. In a wheel barrow including a receptacle and a pair of side bars spaced below said receptacle and secured thereto, the improvement consisting of providing steering means for said wheelbarrow, said steering means comprising a slide arranged adjacent the front end of each of said side bars and mounted for sliding movement therealong, an axle arranged below said slide and operatively connected thereto, a wheel on said axle for supporting said receptacle, and means for moving said slides along said side bars.

JOSEPH A. LA RIVIÈRE.

REFERENCES CITED

The following references are of record in the file of this patent:

UNITED STATES PATENTS

| Number | Name | Date |
|---|---|---|
| 633,648 | Kauffman | Sept. 26, 1899 |
| 1,724,774 | Parrott | Aug. 13, 1929 |